April 9, 1957  L. W. YOUNG ET AL  2,788,436
AUTOMATIC LAMINATED-ASSEMBLY WELDING
Filed Feb. 28, 1955
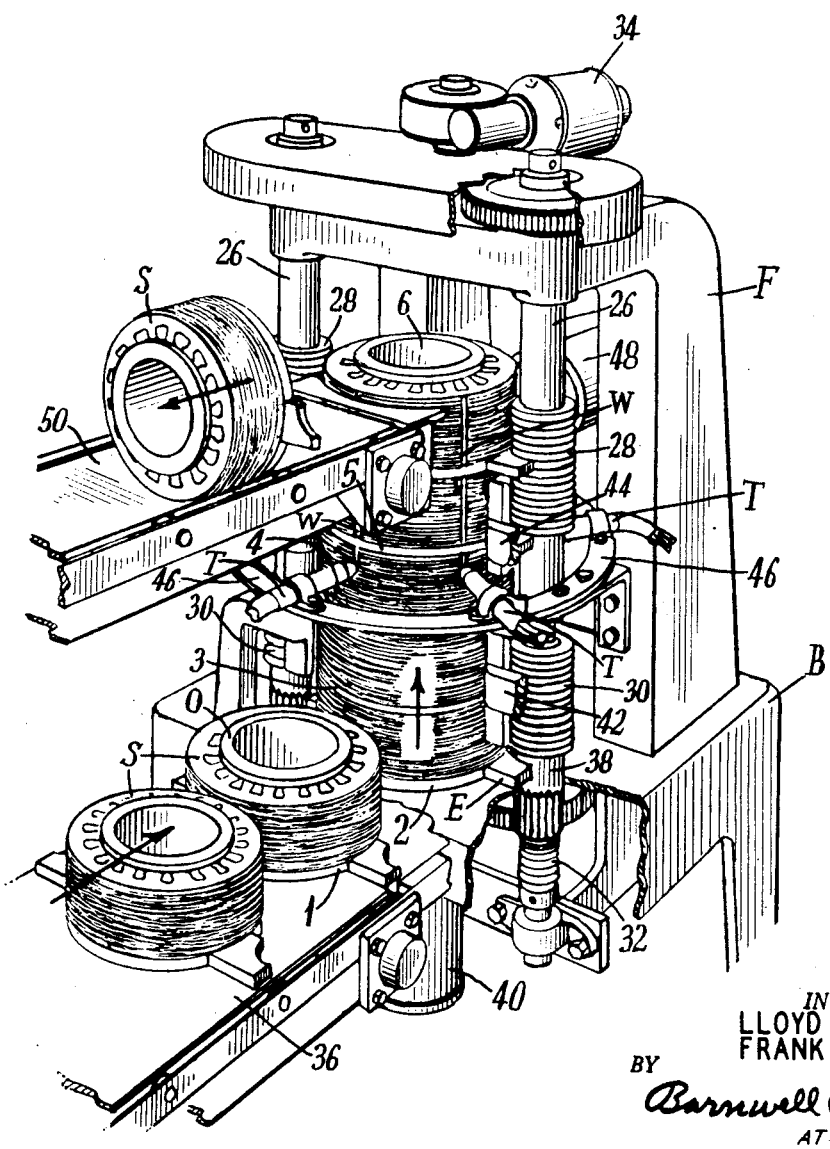
INVENTORS
LLOYD W. YOUNG
FRANK J. PILIA
BY
Barnwell R. King
ATTORNEY 2,788,436
AUTOMATIC LAMINATED-ASSEMBLY WELDING

Lloyd W. Young, Elizabeth, and Frank J. Pilia, West Orange, N. J., assignors to Union Carbide and Carbon Corporation, a corporation of New York Application February 28, 1955, Serial No. 490,852

7 Claims. (Cl. 219—137)

This invention relates to welding and more particularly to inert gas-shielded arc welding of laminated assemblies.

According to the invention there is provided a novel method of and means for greatly reducing the cost and improving the quality of the operation.

Broadly, the method involves continuously welding laminated assemblies by forming the assemblies progressively into a column thereof, and moving the assemblies in such column through a welding station. In such welding station the laminations are accurately compressed in the direction of the column, and while compressed the laminations of each assembly are welded with torch welding means aimed at the column as the assemblies move in succession through such station. After being so welded each assembly is decompressed and discharged from the column. The torch welding means may be energized continuously during the operation.

The equipment comprises means for automatically forming a vertical column of laminated assemblies, and upper and lower horizontal conveyors for automatically feeding laminated assemblies to and removing them from such column. A welding station is provided with torches directed toward the column for bead-welding the assemblies along one or more vertical lines as they are raised in the direction of the column by novel elevating means set forth in greater detail below. Operation of the equipment is continuous and automatic, with efficient and uniform results.

The laminations have been held together in the past by rivets or bolts. With such construction it is difficult to obtain the compression which yields the maximum electrical efficiency consistent with mechanical rigidity. If the compression is too great, the electrical efficiency is low. If the compression is not great enough the stator will not be rigid.

The inert gas-shielded, refractory-electrode, arc welding process produces rigid stators without overcompression. Until now such method of fabrication has had a limited use due to the relatively higher cost thereof. The process is used, however, whenever the superior quality which may be obtained justifies the additional cost. More extensive use of such welding depends upon decreasing costs by improving the efficiency of a given application.

Single torch operation is slower than multiple torch operation. The gas consumption per stator is dependent more upon the gas flow during indexing between welds, and cooling of the electrodes between stators, than that consumed in the actual welding operation. Therefore, the gas consumption per stator with multiple torches may be greater than for a single torch, since the cooling time is greater than the indexing time. The choice of a single or multiple torch machine depends therefore upon whether the labor saving of multiple torches compensates for the additional investment and possible increased gas cost.

A vertical type machine is being used in which all welds are made simultaneously in either the up or down direction. Under certain conditions, where the stator being welded is relatively short, more than one stator may be stacked on a mandrel and welded at the same time. Multiple stacking reduces the number of cooling cycles required per stator in comparison with single stator welding. Such method is practical as long as the combined weights of the stators and the mandrel are not too heavy for the operator to handle.

The welding machines previously used for stator welding are inefficient with regard to the use of the shielding gas. A minimum of 50% of the gas consumed is used during non-welding operations. This value may be as high as 80% or more depending on the fixtures.

The continuous stator welder of our invention overcomes such difficulties. The arcs of such continuous stator welder operate constantly. The only non-welding gas consumption takes place when the arc passes over the copper separators and during the electrode cooling when the machine is shut down at the end of an operating period. The stators feed into the bottom of the machine and pass vertically up through the arcs. The welded stators are ejected at the top of the machine and are removed by a conveyor system. All of the welds are made simultaneously. The welding speed directly controls the production capacity of the machine.

The production capacity of our machine for 1, 2 and 3 inch stator packs at welding speeds ranging from 0 to 100 inches per minute ranges from 1500 to 3500 packs (stators)/hr. The number of stators per hour is based on the pack height plus the ½ inch width of the copper separation bar between the stators. With this machine it is possible to reduce the welding costs to one or two mils per stator for consumables. This is lower than the present cost of riveting and makes possible the economical welding of stators for all fractional horsepower motors where weldable materials are used. This machine also makes it possible to set up integrated assembly lines from the stamping press to the welder. When using this automatic machine, the welding speed is no longer the primary controlling factor in determining how fast the stator pack line may operate.

The machine of the invention is designed to weld motor stator laminations using either the refractory-electrode inert gas-shielded arc welding process or the sigma welding process. The machine welds stators continuously to reduce the gas cost and labor per stator to a minimum. The stators are propelled in a vertical direction past stationary torches, all welds being made simultaneously.

In the drawing:

The single figure is a fragmentary perspective view of an automatic welding machine for continuously fabricating stator packs according to the invention.

The illustrated machine comprises a frame F mounted on a base B. Such frame contains two vertical shafts 26 containing screw threads 28, 28 and 30, 30. The upper screw threads 28 are synchronized for rotation and control the speed at which the stators S pass through the machine. The lower threads 30 float vertically and are driven by a torque responsive type system. Such system may consist of an air motor, a hydraulic motor, or a slip clutch in order to provide for operation under conditions of complete stalling. The lower threads 30 are overdriven for their free speed as compared to the top threads 28. The lower threads 30 are allowed to float vertically and are restrained by a spring 32 at the lower end of each of the vertical shafts 26. The vertical float of threads 30 allows for a variation in the height of the laminated assemblies and provides relatively instantaneous takeup for the torque responsive system if the torque responsive system should fail to accelerate rapidly enough. The laminations are compressed in the machine by the fact that the lower threads 30 are overdriven as compared to the top threads 28. The difference in driving force between the two threads controls the compression of the laminations. Each of the lower screws 30 comprises a sleeve which rotates and floats vertically on shaft 26 so as to be free to rotate at speeds different from upper threads 28. Motor 34 drives screws 28 and determines the speed of welding. Screws 30 are driven by a motor not shown, said motor being of controlled torque responsive type. An alternate method of driving screws 30 would be a slip type clutch which could be adjusted to maintain the desired continuous compression force on the stack.

In operation the laminations are loaded onto mandrels and are fed into the conveyor system as shown by mandrel 1. A conveyor 36 places the mandrel and the laminations in the position of mandrel 2 with the ears E of the mandrel against the sleeves 38. The ears E are below the level of the bottom screws 30. An annular boss O projecting through the top of the laminations formed by an extension of the mandrel must clear the bottom of the previous mandrel 3 before the mandrel 2 and its laminations can be located in this position. Air cylinder 40 raises mandrel 2 and its laminations to engage the projecting boss O in a mating recess in the underside of mandrel 3. Pressure is maintained in an upward direction by air cylinder 40 until the projecting ears E on the side of the mandrel engage the lower threads 30. With the ears engaged in the lower threads 30, air cylinder 40 retracts to await arrival of the next stator and mandrel.

As the stator progresses vertically, the ears E of mandrel 3 become disengaged as they leave the top of the screws 30. They then become stator 4. At such moment the laminations of stator 2 become compressed (stator 3) by virtue of the fact that the lower screws are overdriven and spring loaded. Two sets 42 and 44 of guides on the side of the machine bear against the back of the ears E to provide vertical alignment of the stators and to keep the ears E engaged with the threads 29—30. As the stator in mandrel 4 moves vertically through the machine, the arc welding torches T mounted on a ring 46 produce the required welds W. Any desired number of welds can be made simultaneously with this arrangement.

After welding, the ears E of the mandrel 5 engage the upper screw threads 28. The laminations are held under compression while in mandrel 5. The laminations are released from compression in mandrel 6. When the stator reaches the top of the machine, an air cylinder 48 in the rear of the machine presses against the top of the stator, tipping the stator and its mandrel 90 degrees to place it on a conveyor 50. The 90 degree rotation of the stator 6 is necessary to clear the projecting boss O of the mandrel 5 in order to peel the mandrel 6 from the vertical column as it passes through the machine.

The interlocking mandrels form a rigid vertical column as they progressively move through the machine, adding to the stability and alignment of the parts as they are welded. The conveyor system 50 at the top of the machine carries the finish-welded parts to an unloading station where the mandrel is stripped from its stator and returned to the initial loading position. This system makes possible the use of completely automatic stator assembly lines. The stamping press can be conveyor-coupled to a degreasing unit and then to an automatic loading station which would properly orient and place the laminations on the mandrels. The loaded mandrels are then carried to the machine by conveyor 36, automatically placed in the machine, welded and ejected in order to complete the fabrication of each stator.

While the invention described above incorporates a system of lead screws for continuously feeding the stator packs past the welding torches, other motivating means could be used such as drive rolls or chains.

Also the invention obviously may be applied to the fabrication of other laminated assemblies such as relays, transformers, chokes, circuit breakers, servomotors, locks, electric clocks, motor armatures, generators, magnetos, meter magnets and toy train motors. The geometry of these assemblies need not be symmetrical or round.

We claim:

1. Method of continuously welding laminated assemblies, which comprises forming such assemblies progressively into a column thereof, moving such assemblies in said column through a welding station, compressing the laminations in such welding station, and welding the edges of such compressed laminations with torch welding means aimed at such column as the assemblies move through such station, while continuously supplying gas to such torch means.

2. Method as defined by claim 1, in which the assemblies in the column are compressed prior to entering the welding station, are maintained under compression throughout the welding operation, and are decompressed thereafter in such column.

3. Method of continuously welding stacks of metal laminations, which comprises assembling each stack, successively delivering the so-assembled stacks to an upwardly moving vertical column thereof, compressing such stacks as they move through a welding station having inwardly pointed continuously operating torches, welding each stack of laminations with such torches as the stack moves in such column through such station, and successively unloading the so-welded laminated stacks from such column.

4. Method of continuously welding stacks of metal laminations, which comprises assembling each stack on a mandrel, successively delivering the so-assembled stacks and mandrels to an upwardly moving vertical column thereof, compressing such stacks and mandrels as they move through a welding station having inwardly pointed continuously operating torches, welding each stack of laminations with such torches as the stack moves in such column through such station, successively unloading the so-welded laminated stacks from such column, and separating each unloaded stack from its mandrel.

5. In an automatic machine for continuously welding assemblies of metal laminations, the combination of a conveyor for successively delivering assemblies of metal lamination to a welding station, an elevator for raising each of such assemblies in succession through such station, gas-shielded arc welding torches located in such station for simultaneously arc welding together the lamination of each assembly during such elevation, and a conveyor for removing the so-welded assemblies in succession from said welding station.

6. In an automatic machine as defined by claim 5, an elevator including screw means acting to maintain the laminations of the assembly being welded under compression.

7. An automatic welding machine comprising the combination of a base, a frame mounted on said base, a horizontal ring mounted on said frame, a plurality of inert gas-shielded arc welding torches mounted on said ring so as to be inwardly directed, a pair of vertical shafts supported at the top by said frame and at the bottom by said base, said shafts being spaced symmetrically from the vertical axis of said ring, a pair of vertically fixed upper screw threads on said shafts, means including a drive motor mounted on said frame for driving in unison said upper threads through said shafts, a pair of floating sleeves on said shafts provided with threads located below said upper threads, and springs urging said sleeves upwardly, means including a torque responsive system for driving said lower threads in unison, means including a lower conveyor for delivering in succession laminated assemblies loaded on mandrels having diametrically opposed threaded ears into engagement with said sleeves, means including an elevator for raising each loaded mandrel until such threaded ears engage said lower screw threads, vertical guides for keeping said ears in threaded engagement with said lower threads, means mounted on said frame for tilting welded assemblies and mandrels from the top of a column thereof, and means including an upper conveyor for removing the so-tilted assemblies and mandrels in succession.

References Cited in the file of this patent
UNITED STATES PATENTS

| | | |
|---|---|---|
| 1,204,037 | Laher | Nov. 7, 1916 |
| 1,619,346 | Houston et al. | Mar. 1, 1927 |